May 17, 1932. W. SCHILLER 1,858,308

APPARATUS FOR THE PREPARATION OF FILMS OF BLOOD

Filed March 12, 1930

W. Schiller
INVENTOR

By: Marks & Clerk
Attys.

Patented May 17, 1932

1,858,308

UNITED STATES PATENT OFFICE

WALTER SCHILLER, OF VIENNA, AUSTRIA

APPARATUS FOR THE PREPARATION OF FILMS OF BLOOD

Application filed March 12, 1930, Serial No. 435,326, and in Austria March 16, 1929.

For the purpose of carrying through the necessary blood researches in hospitals there is made use of blood films prepared by spreading out a little drop of blood in a thin layer upon a supported base. The blood is generally spread out by passing over a fixed base an obliquely held plate of glass, on the under edge of which the drop of blood is distributing. This process requires exercise and aptness, but even the exercised operator hardly succeeds in preparing several or at least two films of blood in a perfectly equal manner.

The invention has therefore the purpose to enable the mechanical preparation of films of blood by an apparatus which can easily be operated and carried in a bag by every practical physician. Such a mechanical preparation has been proposed by the German Patent No. 439,124, of May 20, 1925, Class 42 h, Group 34. The apparatus according to the present invention differs from the object of the cited patent by the fact that the mentioned mechanical preparation of the film of blood, instead of being effectuated by a fixed base and a sliding rigid glass plate, is enabled by a sliding base and a small plate which is stationary during the movement of the base. The small stationary plate is made as a combination of rigid and elastic material and arranged upon a frame.

The angle between the support of the sliding base and the support of the frame of the stationary plate as well as the angle between the frame of the stationary plate and the support of this frame, furthermore the elastic pressure of the stationary plate against the sliding base may be varied. Besides that the rigid part and the elastic part of the stationary plate may be displaced longitudinally in any desired degree to each other.

Figure 1:
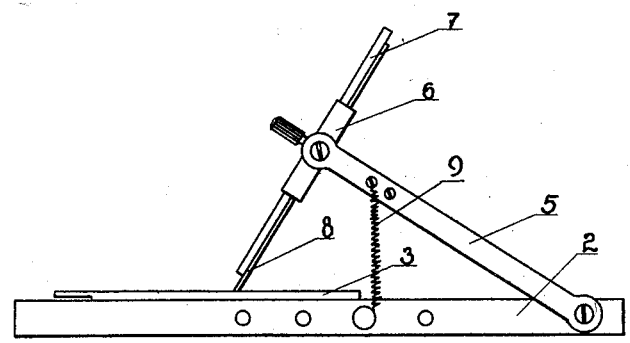
Figure 2:
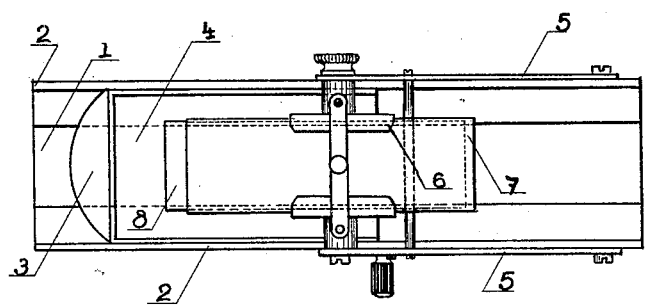
Figure 3:
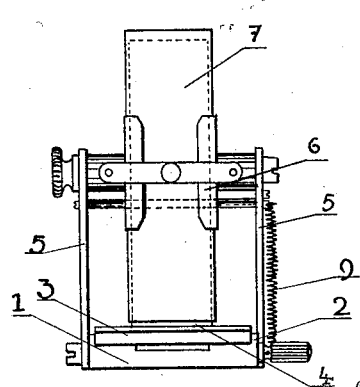

The drawings illustrate an example of performance of the object of invention. There are shown in Fig. 1a side view, in Fig. 2 an upper view and in Fig. 3 a front view of the apparatus. The apparatus consists of a base plate 1 with parallel ledges 2 between which a slide 3 is sliding which bears the base 4. The base plate 1 is connected by joints with a frame 5 which on its upper end is articulated to a support 6 of the spreading plate. There is employed as spreading plate a small plate 7 of rigid material (glass or the like) which is reinforced by a small plate 8 of celluloid in such a manner that the latter projects less or more with its under edge and spreads out the drop of blood by said edge. If desired there can only be used the rigid small plate of glass or the like to spread out the drop of blood and the elastic plate may be shoved back. A lateral spring 9 is pressing the support of the frame and therewith also the small blood-spreading plate to the sliding base.

The described performance of the apparatus and the various possibilities of adjustment of its essential parts enable a precise accommodation to the spreading process as required in special cases.

What I claim is:

1. In an apparatus for the preparation of films of blood for examination, a fixed supporting base plate, a blood carrying plate slidably mounted in the base plate, a frame hingedly mounted on the base plate, a film spreading plate swingably mounted in the frame, adapted to be held in a stationary position while the slidable plate is slid along the base plate for the purpose of spreading the drop of blood out into a film.

2. In an apparatus for preparing a drop of blood for examination, a fixed supporting base plate, a blood carrying plate slidably mounted on the base plate, a hingedly mounted frame on the base plate, a film spreading plate swingably mounted in the frame comprising a plate of rigid material, and a plate of elastic material, the edge of which projects beyond the lower edge of the rigid plate, the said film spreading plate being adapted to occupy a fixed position, while the slidable plate carrying the drop of blood is operated along the fixed base plate for the purpose of spreading the drop of blood out into a film.

3. In an apparatus for preparing films of blood for examination, a supporting base plate, a blood carrying plate slidably operating on the base plate, a hingedly mounted frame on the base plate, a swingable film spreading plate mounted in the frame which may be placed at various angles of incidence with reference to the slidable plate, and is adapted to be held in fixed position while the slidable plate is operated, and resilient means for holding the spreading plate against the slidable plate.

In testimony whereof I have signed my name to this specification.

WALTER SCHILLER.